United States Patent
He et al.

(10) Patent No.: US 6,178,098 B1
(45) Date of Patent: Jan. 23, 2001

(54) PHASE-SHIFTED POST-REGULATOR, METHOD OF OPERATION THEREOF AND POWER CONVERTER EMPLOYING THE SAME

(75) Inventors: Jin He, Plano; Mark E. Jacobs, Dallas, both of TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/401,728

(22) Filed: Sep. 22, 1999

(51) Int. Cl.$^7$ ................................................. H02M 3/335
(52) U.S. Cl. ............................... 363/17; 363/75; 363/82; 363/90
(58) Field of Search .................. 363/17, 76, 75, 363/82, 90

(56) References Cited

U.S. PATENT DOCUMENTS 5,625,539 * 4/1997 Nataka et al. ........................ 363/17
5,731,968 * 3/1998 Van Der Broeck et al. .......... 363/71

OTHER PUBLICATIONS

"Full–Load–Range–ZVS Hybrid DC–DC Converter with Two Full–Bridges for High–Power Battery Charging" by Rajapandian Ayyanar and Ned Mohan; 1999 IEEE; 8 pg, No Month No Page #'s.

"A Novel Soft–Switching DC–DC Converter with Wide ZVS–Range and Reduced Filter Requirement" by Rajapandian Ayyanar and Ned Mohan; 1999 IEEE; pp. 433–438, No Month.

"A Novel Soft–Switching Converter with Reduced Filter Requirement" by Rajapandian Ayyanar and Ned Mohan; Sep. 1998 Workshop Presentation: 20 pp.

* cited by examiner

*Primary Examiner*—Shawn Riley

(57) ABSTRACT

For use in a power converter having an inverter coupled to an output rectifier, a post-regulator, a method of operating the same and a power converter incorporating the post-regulator or the method. In one embodiment: (1) a switching circuit, having at least one controllable switch and coupled an output of the power converter, that receives an output voltage from the power converter and produces a phase-shifted waveform therefrom and (2) a transformer, having a primary winding coupled to the switching circuit and a secondary winding coupled to the rectifier, that delivers the phase-shifted waveform to the rectifier to regulate the power converter, thereby allowing the inverter to be unregulated.

18 Claims, 4 Drawing Sheets

PHASE-SHIFTED POST-REGULATOR, METHOD OF OPERATION THEREOF AND POWER CONVERTER EMPLOYING THE SAME

TECHNICAL FIELD OF THE INVENTION

The present invention is directed, in general, to power conversion and, more specifically, to a phase-shifted post-regulator, a method of operating the post-regulator and a power converter employing the system or the method.

BACKGROUND OF THE INVENTION

The development of more efficient and lower noise power converters is a continuing goal in the field of power electronics. Power converters are typically employed in applications that require conversion of an input DC voltage to various other DC voltages, higher or lower than the input DC voltage. Examples include telecommunication and computer systems wherein high voltages are converted to lower voltages to operate the systems. Power converters often suffer from problems such as switching losses, switching noise and common-mode noise originating in the power transformer. Switching losses reduce system efficiency, resulting in greater input power requirements for the same output power. Switching and common-mode transformer noise, both conducted and radiated, require filtering to prevent or reduce interference with other sensitive electronic equipment.

Current power converter designs often implement one of two full bridge control strategies, namely, the conventional full bridge or the phase-shifted full bridge. Both control strategies employ a full bridge inverter topology having four controllable switches (e.g., power metal-oxide semiconductor field-effect transistors), an isolation transformer, an output rectifier and an output filter. A controller is included and employed to control the controllable switches.

The conventional full bridge generally operates as follows. The controllable switches are arranged in two diagonal pairs that are alternately turned on for a portion of a switching period to apply opposite polarities of the input DC voltage across a primary winding of the isolation transformer. The controllable switches thus operate to convert the input DC voltage into an AC voltage to operate the isolation transformer. Between conduction intervals of the diagonal pairs, all of the controllable switches are turned off for a fraction of the switching period. Ideally, this should force a voltage across the primary winding of the isolation transformer to zero. The output rectifier then rectifies the AC voltage from the isolation transformer. A rectified voltage of the isolation transformer should, therefore, ideally be a square wave with an average value proportional to a duty ratio of the diagonal pairs of controllable switches.

The output filter smooths and filters the rectified voltage to provide a substantially constant output voltage at the output of the power converter. The controller monitors the output voltage and adjusts the duty ratio of the diagonal pairs of controllable switches to maintain the output voltage at a constant level as the input DC voltage and the load current vary.

In practice, the rectified voltage is not a perfect square wave, however, because turning off all of the controllable switches induces a ring between a leakage inductance of the isolation transformer and a parasitic capacitance of the controllable switches. The ringing dissipates energy, thereby reducing the efficiency of the power converter. The ringing also gives rise to significant noise, such as conducted and radiated electromagnetic interference.

The phase-shifted full bridge was developed to alleviate the switching loss and switching noise problems of the conventional full bridge. The construction of the phase-shifted full bridge is essentially identical to that of the conventional full bridge. Its advantages result, however, from the operation of the controllable switches to produce a zero voltage across the controllable switches before the controllable switches are turned on. The phase-shifted full bridge operates by turning off only one controllable switch of a diagonal pair to begin the zero voltage period, instead of turning off both of the controllable switches. A controllable switch from the alternate pair is then turned on, allowing the current in the primary circuit to circulate through the two controllable switches with substantially zero volts across the isolation transformer.

The two controllable switches thus clamp the voltage across the isolation transformer at about zero, thereby substantially eliminating the ringing behavior suffered by the conventional full bridge when the controllable switches are off. By clamping both ends of the primary winding of the isolation transformer to one rail and then, to the other rail, however, the phase-shifted full bridge induces a current flow through an intrinsic primary-to-secondary capacitance of the isolation transformer. As a capacitor potential is alternately charged from rail to rail, a common-mode noise may be generated.

Furthermore, alternately circulating the primary current through the two top or bottom controllable switches may result in additional conduction losses. During the circulation intervals of the primary current, both the input current to the bridge and the output voltage applied to the output filter are substantially zero, requiring both input and output filtering.

Accordingly, what is needed in the art is a power converter that retains the efficiency advantages of the full-bridge topology while alleviating the deficiencies associated with the conventional design.

SUMMARY OF THE INVENTION

To address the above-discussed deficiencies of the prior art, the present invention provides, for use in a power converter having an inverter coupled to an output rectifier, a post-regulator, a method of operating the same and a power converter incorporating the post-regulator or the method. In one embodiment, the post-regulator includes: (1) a switching circuit, having at least one controllable switch and coupled to an output of the power converter, that receives an output voltage from the power converter and produces a phase-shifted waveform therefrom and (2) a transformer, having a primary winding coupled to the switching circuit and a secondary winding coupled to the rectifier, that delivers the phase-shifted waveform to the rectifier to regulate the power converter, thereby allowing the inverter to be unregulated.

The present invention therefore introduces the broad concept of feeding back the phase-shifted waveform to regulate the power converter. This advantageously allows the inverter to operate in a more efficient mode.

In one embodiment of the present invention, the inverter is unregulated. In a related embodiment, the inverter is operated at a full duty cycle. Those skilled in the pertinent art realize the efficiency advantages associated with operating the inverter at full duty cycle.

In one embodiment of the present invention, the switching circuit phase shifts the waveform to increase and decrease the output voltage. The capability to increase and decrease the output voltage allows a power rating of the post-regulator to be substantially reduced (e.g., by a factor of two).

In one embodiment of the present invention, the inverter is selected from the group consisting of: (1) a full-bridge inverter and (2) a half-bridge inverter. Those skilled in the pertinent art will understand, however, that any conventional or later-discovered inverter topology can be employed with the post-regulator of the present invention.

In one embodiment of the present invention, the switching circuit is selected from the group consisting of: (1) a full-bridge topology and (2) a half-bridge topology. Those skilled in the pertinent art will understand, however, that any conventional or later-discovered topology can be employed in the post-regulator of the present invention.

In one embodiment of the present invention, the secondary winding is coupled to a first rectifying diode of the rectifier and the transformer has a second secondary winding coupled to a second rectifying diode of the rectifier. In an embodiment to be illustrated and described, the secondary windings are coupled in series with the first and second rectifying diodes.

In one embodiment of the present invention, the switching circuit operates in a zero voltage switching mode (a mode in which switching occurs at a minimal, preferably zero, voltage to reduce switching losses) to produce the phase-shifted waveform. Those skilled in the pertinent art will understand, however, that zero voltage switching is not necessary to the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
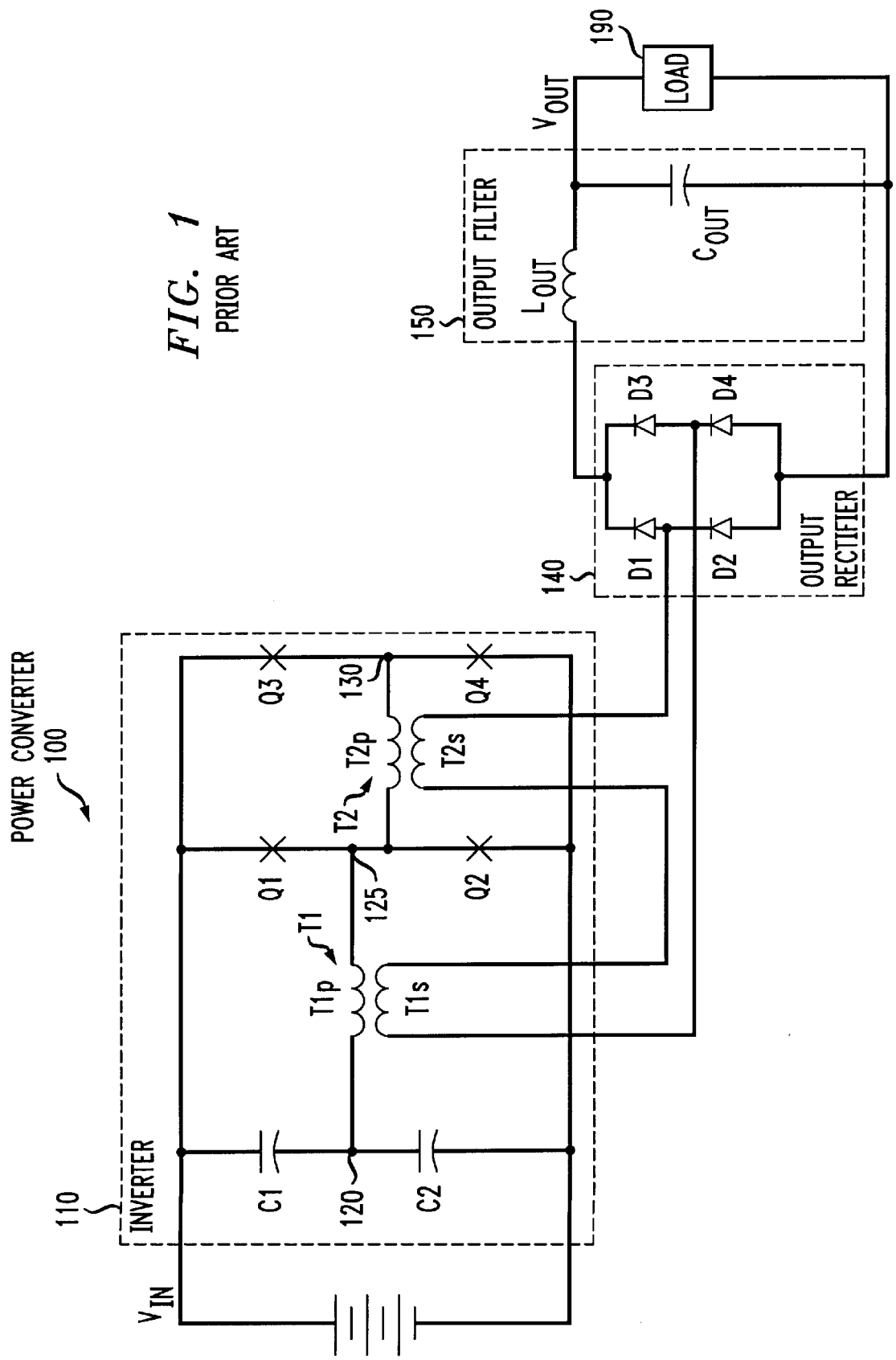
FIG. 1 illustrates a schematic diagram of an embodiment of a power converter of the prior art.

Referring initially to FIG. 1, illustrated is a schematic diagram of an embodiment of a power converter 100 of the prior art. The power converter 100 includes an inverter 110 coupled to an input of the power converter 100. The power converter 100 further includes a first isolation transformer T1 and a second isolation transformer T2 having respective primary windings T1p, T2p coupled to the inverter 110. The power converter 100 further includes an output rectifier 140, coupled to respective secondary windings T1s, T2s of the first and second isolation transformers T1, T2, that rectifies a periodic waveform supplied by the first and second isolation transformers T1, T2. The power converter 100 further includes an output filter 150 coupled to the output rectifier 140. The output filter 150 filters the rectified waveform from the output rectifier 140 to supply an output voltage $V_{OUT}$ to a load 190 at an output of the power converter 100.

The inverter 110 is a hybrid combination including a half-bridge section and a full-bridge section. The half-bridge section includes first and second capacitors C1, C2 coupled across the input. The half-bridge section further includes first and second controllable switches Q1, Q2 coupled across the input. The primary winding T1p of the first isolation transformer T1 is coupled between a first node 120 (between the first and second capacitors C1, C2) and a second node 125 (between the first and second controllable switches Q1, Q2) of the inverter 110.

The full-bridge section includes the first and second controllable switches Q1, Q2 and third and fourth controllable switches Q3, Q4 coupled across the first and second controllable switches Q1, Q2. The primary winding T2p of the second isolation transformer T2 is coupled between the second node 125 and a third node 130 (between the third and fourth controllable switches Q3, Q4) of the inverter 110. Since the first and second controllable switches Q1, Q2 are commonly employed by both the half-bridge section and the full-bridge section, the inverter 110 may advantageously realize the hybrid combination using only four controllable switches (as in a conventional full-bridge inverter). The outputs of the half-bridge section and the full-bridge section are then combined by serially-coupling the first and second secondary windings T1s, T2s of the first and second isolation transformers T1, T2.

The output rectifier 140 includes first, second, third and fourth rectifying diodes D1, D2, D3, D4 arranged in a bridge rectifier topology. The first, second, third and fourth rectifying diodes D1, D2, D3, D4 are coupled to the first and second secondary windings T1s, T2s of the first and second transformers T1, T2 and receive the periodic waveform therefrom. The output rectifier 140 rectifies the periodic waveform to provide a rectified waveform to the output filter 150. Those skilled in the pertinent art are familiar with output rectifiers. Of course, other rectifier topologies, including those employing synchronous rectifiers, are well within the broad scope of the present invention.

The output filter 150 includes an output inductor Lou coupled to an output capacitor $C_{OUT}$. The output filter 150 receives the rectified waveform from the output rectifier 140 and smooths and filters the rectified waveform to maintain the output voltage $V_{OUT}$ at a substantially constant level. Those skilled in the pertinent art are familiar with the output filter illustrated and described. Of course, other filter topologies are well within the broad scope of the present invention.

The power converter 100 is operated in a hybrid mode of operation wherein the half-bridge section is uncontrolled while a pulse-width of the full-bridge section is controlled by varying a phase shift between a first leg of the inverter 110 (including the first and second controllable switches Q1, Q2) and a second leg of the inverter 110 (including the third and fourth controllable switches Q3, Q4). Since the first, second, third and fourth controllable switches Q1, Q2, Q3, Q4 are all operated at a 50% duty cycle, a voltage across the first isolation transformer T1 may be a square waveform at full duty cycle. The voltage across the second isolation transformer T2 may then be regulated by changing the phase shift between the first and second legs to produce a pulse-width modulated waveform. The square waveform and the pulse-width modulated waveform are then combined at the output rectifier 140 and rectified to produce the desired output voltage $V_{OUT}$.

In the illustrated power converter 100, the output voltage $V_{OUT}$ is regulated against variations in the input voltage $V_{IN}$ and the load 190 by varying the phase shift and, therefore, the pulse-width of the first and second legs of the full-bridge section. While the illustrated power converter 100 may be adequate for a number of applications, the power converter 100 suffers from the following deficiencies.

In the power converter 100, the half-bridge section and the full-bridge section share a common pair of controllable switches (i.e., first and second controllable switches Q1, Q2). The power converter 100, therefore, may be arranged such that adjusting the relative phases of the half-bridge section and the full-bridge section will either increase or decrease the level of the output voltage $V_{OUT}$. The power converter 100, however, is unable to accommodate phase shifting such that the output voltage $V_{OUT}$ may be both increased and decreased. Further, in the power converter 100, both the half-bridge section and the full-bridge section receive power from the input of the power converter 100. The power converter 100 thus requires two transformers (both the first and second isolation transformers T1, T2), thereby creating two paths for common-mode currents to flow between the inverter 110 and the output of the power converter 100. Additionally, under normal operating conditions, the full-bridge section is only capable of subtracting a voltage from the output voltage $V_{OUT}$ of about half of the voltage regulation range.

Figure 2:
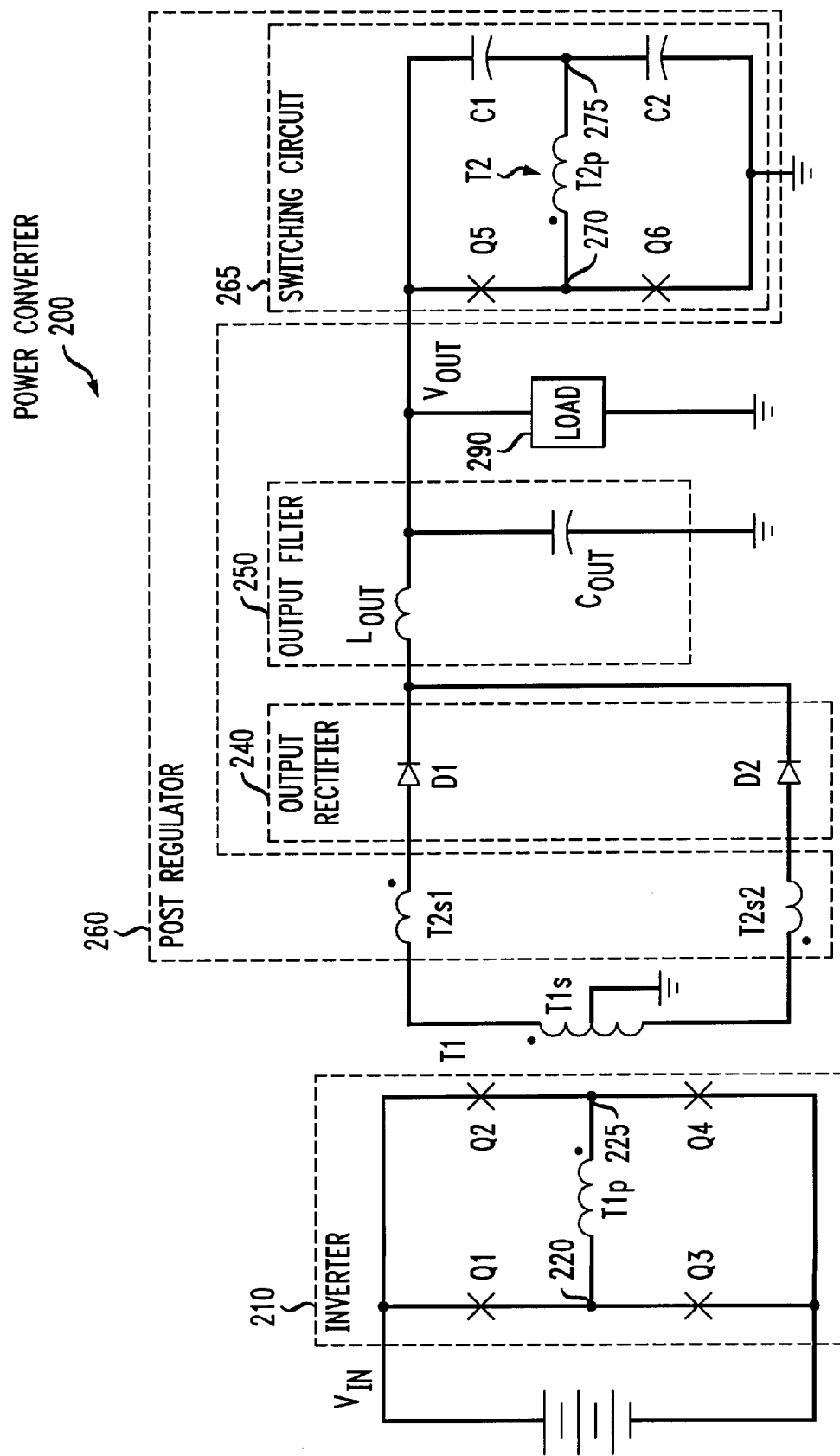
FIG. 2 illustrates a schematic diagram of an embodiment of a power converter constructed in accordance with the principles of the present invention.

Turning now to FIG. 2, illustrated is a schematic diagram of an embodiment of a power converter 200 constructed in accordance with the principles of the present invention. The power converter 200 includes an inverter 210 coupled to an input of the power converter 200. The power converter 200 further includes an isolation transformer T1 having a primary winding T1p coupled to the inverter 210. The power converter 200 further includes an output rectifier 240, coupled to a secondary winding T1s of the isolation transformer T1, that rectifies a periodic waveform supplied by the isolation transformer T1. The power converter 200 further includes an output filter 250 coupled to the output rectifier 240. The output filter 250 filters the rectified waveform from the output rectifier 240 to supply an output voltage $V_{OUT}$ to a load 290 at an output of the power converter 200. The power converter 200 still further includes a post-regulator 260, coupled to the output of the power converter 200 and the output rectifier 240, that regulates the output voltage $V_{OUT}$ of the power converter 200.

In the illustrated embodiment, the inverter 210 includes first, second, third and fourth controllable switches Q1, Q2, Q3, Q4 arranged in a full-bridge topology. The primary winding T1p of the isolation transformer T1 is coupled between a first node 220 (between the first and third controllable switches Q1, Q3) and a second node 225 (between the second and fourth controllable switches Q2, Q4) of the inverter 210. While the illustrated embodiment discloses a full-bridge inverter 210, those skilled in the pertinent art will realize that the principles of the present invention may be employed with a wide variety of inverter topologies, including a half-bridge inverter.

The output rectifier 240 includes first and second rectifying diodes D1, D2 arranged as a full wave rectifier. The first and second rectifying diodes D1, D2 are coupled to the secondary winding T1s of the isolation transformer T1 and receive the periodic waveform therefrom. The output rectifier 240 rectifies the periodic waveform to provide a rectified waveform to the output filter 250. Those skilled in the pertinent art are familiar with full-wave rectifiers and realize that other rectifier topologies, including those employing synchronous rectifiers, are well within the broad scope of the present invention.

The output filter 250 includes an output inductor $L_{OUT}$ coupled to an output capacitor $C_{OUT}$. The output filter 250 receives the rectified waveform from the output rectifier 240 and smooths and filters the rectified waveform to maintain the output voltage $V_{OUT}$ at a substantially constant level. Those skilled in the pertinent art are familiar with output filters. Of course, other filter topologies are well within the broad scope of the present invention.

The post-regulator 260 includes a switching circuit 265 and a regulator transformer T2. In the illustrated embodiment, the switching circuit 265 includes fifth and sixth controllable switches Q5, Q6 coupled to the output of the power converter 200. The switching circuit 265 further includes first and second capacitors C1, C2 coupled across the fifth and sixth controllable switches Q5, Q6. While the switching circuit 265 illustrated and described has a half-bridge topology, those skilled in the pertinent art realize that other switching topologies are well within the broad scope of the present invention.

In the illustrated embodiment, the regulator transformer T2 has a primary winding T2p coupled between a third node 270 (between the fifth and sixth controllable switches Q5, Q6) and a fourth node 275 (between the first and second capacitors C1, C2) of the switching circuit 265. The regulator transformer T2 further has first and second secondary windings T2s1, T2s2 series-coupled between the secondary winding T1s of the isolation transformer T1 and the first and second rectifying diodes D1, D2, respectively. The switching circuit 265 receives the output voltage $V_{OUT}$ from the power converter 210 and produces a phase-shifted waveform therefrom. The regulator transformer T2 then delivers the phase-shifted waveform to the output rectifier 240 to regulate the power converter 200. In the illustrated embodiment, the first and second rectifying diodes D1, D2 process power received from both the secondary winding T1s of the isolation transformer T1 and the respective first and second secondary windings T2s1, T2s2 of the regulator transformer T2.

In the illustrated embodiment, the post-regulator 260 advantageously receives power from the output of the power converter 200 thus providing only one path (i.e., the isolation transformer T1) for common-mode currents to flow between the input and output of the power converter 200. The power converter 200 therefore avoids the second common-mode current path of the power converter 100 illustrated and described with respect to FIG. 1. Further, by employing a switching circuit 265 that is, in the illustrated embodiment, separate from the inverter 210, the post-regulator 260 of the present invention is able to perform both voltage addition and voltage subtraction, resulting in a generally lower power rating requirement for the post-regulator 260. Additionally, by employing independent controllable switches for the inverter 210 and the post-regulator 260, the input ripple current may be reduced, especially under nominal operating conditions.

Figure 3:
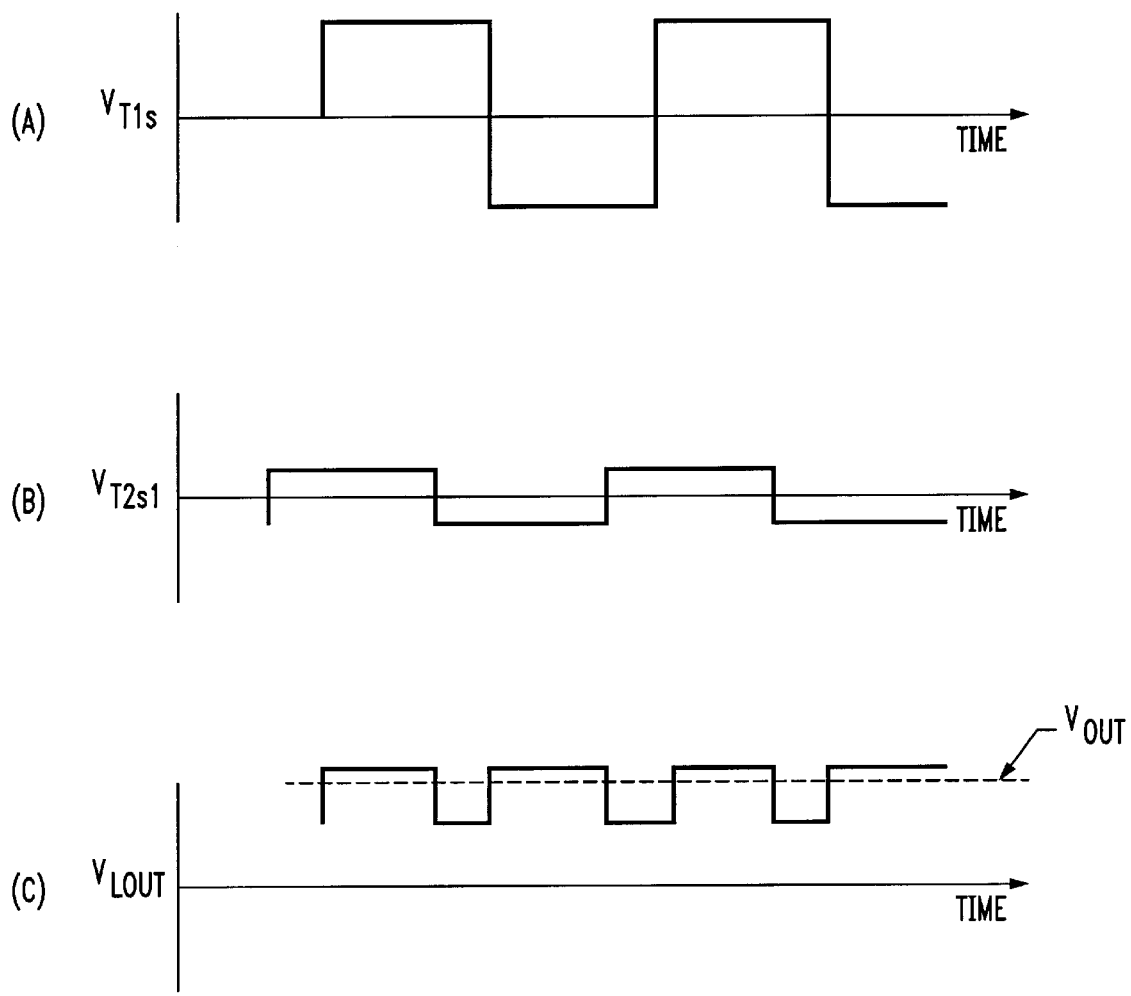
FIG. 3 illustrates exemplary switching waveforms of the power converter of FIG. 2.

Turning now to FIG. 3, illustrated are exemplary switching waveforms of the power converter 200 of FIG. 2. More specifically, FIG. 3A illustrates a voltage $V_{T1s}$ across the secondary winding Ts1 of the isolation transformer T1. FIG. 3B illustrates a voltage $V_{T2s1}$ across the first secondary winding T2s1 of the regulator transformer T2. FIG. 3C illustrates an inductor voltage $V_{LOUT}$ applied to the output inductor $L_{OUT}$. The operation of the power converter 200 will be discussed with continuing reference to FIGS. 2 and 3.

In the illustrated embodiment, the inverter 210 is a full-bridge topology. Full-bridge inverters are typically more efficient when operated symmetrically and at a full duty cycle. Full duty cycle operation has a number of advantages, including (1) avoiding an idling state of the controllable switches that generates common mode noise and conduction losses, (2) more efficient utilization of the controllable switches and the isolation transformer, (3) drawing an input current with substantially reduced ripple components, thereby reducing the input filtering requirement and improving the lifetime of the input filter capacitor, (4) zero-voltage switching mode operation and (5) providing a rectified output voltage with reduced AC components, thereby reducing the output filtering requirement.

The inverter 210 may, therefore, in an advantageous embodiment, be operated at a substantially full duty cycle (100%) wherein the second and third controllable switches Q2, Q3 are on for about a first half of a switching period to apply the input voltage $V_{IN}$ across the primary winding T1p of the isolation transformer T1. Then, for about a second half of the switching period, the first and fourth controllable switches Q1, Q4 are on to apply an opposing polarity of the input voltage $V_{IN}$ across the primary winding T1p. The first, second, third and fourth controllable switches Q1, Q2, Q3, Q4 may thus convert the input voltage $V_{IN}$ into a periodic, alternating waveform required to operate the isolation transformer T1. (See FIG. 3A). Between conduction intervals, the first, second, third and fourth controllable switches Q1, Q2, Q3, Q4 may be turned off for a fraction of the switching period. By operating the inverter 210 at the substantially full duty cycle, an input current to the inverter 210 may be substantially ripple free.

Since the inverter 210 is operated at the substantially full duty cycle, however, the inverter 210 is unregulated. The output voltage $V_{OUT}$ of the power converter 200 may thus fluctuate depending on variations in the input voltage $V_{IN}$ and the load 290. To retain regulation of the output voltage $V_{OUT}$, the power converter 200 employs the post-regulator 260. The post-regulator 260 may increase or decrease the level of the output voltage $V_{OUT}$ to regulate the output of the power converter 200. In the illustrated embodiment, the switching circuit 265 is a half-bridge topology. The switching circuit 265 may be operated at a fixed duty cycle substantially equal to the duty cycle of the inverter 210. (See FIG. 3B). The relative phases of the inverter 210 and the switching circuit 265 may then be controlled such that the voltages $V_{T2s1}$, $V_{T2s2}$ across the first and second secondary windings T2s1, T2s2 of the regulator transformer T2 are added or subtracted from the voltage $V_{T1s}$ across the secondary winding of the isolation transformer T1. The switching circuit 265 may thus control the output power over a range about twice its own power rating.

If the inverter 210 is producing the desired output voltage $V_{OUT}$, the switching circuit 265 may be operated in quadrature with respect to the inverter 210, resulting in substantially no change in the output voltage $V_{OUT}$. Variations in the input voltage $V_{IN}$ and the load 290 may occur, however, requiring the output voltage $V_{OUT}$ to be adjusted to maintain regulation. The relative phase between the inverter 210 and the switching circuit 265 may therefore be changed to regulate the output voltage $V_{OUT}$.

In the embodiment illustrated with respect to FIG. 3, the relative phase between the inverter 210 and the switching circuit 265 may be adjusted such that the in-phase components of the voltage $V_{T1s}$ across the secondary winding Ts1 of the isolation transformer T1 and the voltage $V_{T2s1}$ across the first secondary winding T2s1 of the regulator transformer T2 are slightly additive, resulting in a small increase in the output voltage $V_{OUT}$ due to the contribution of the switching circuit 265. Further, since the fifth and sixth controllable switches Q5, Q6 of the switching circuit 265 carry a positive current (e.g., from drain to source in the case of a field-effect transistor), the switching circuit 265 may be operated in a zero voltage switching mode to minimize switching losses. While the illustrated embodiment operates in a zero voltage switching mode, those skilled in the pertinent art realize that zero voltage switching is not necessary to the present invention.

Figure 4:
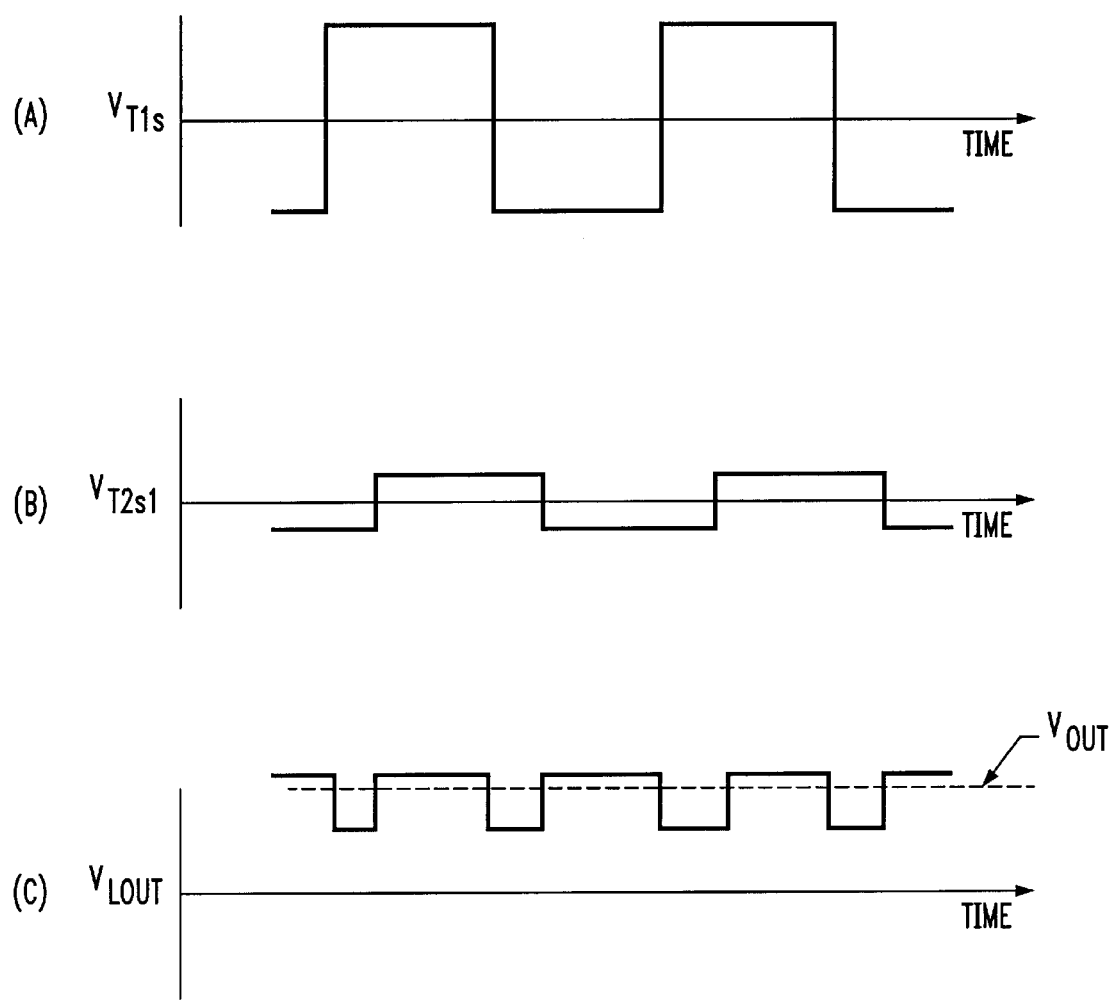
FIG. 4 illustrates alternative switching waveforms of the power converter of FIG. 2.

Turning now to FIG. 4, illustrated are alternative switching waveforms of the power converter 200 of FIG. 2. More specifically, FIG. 4A illustrates a voltage $V_{Ts1}$ across the secondary winding Ts1 of the isolation transformer T1. FIG. 4B illustrates a voltage $V_{T2s1}$ across the first secondary winding T2s1 of the regulator transformer T2. FIG. 4C illustrates an inductor voltage $V_{LOUT}$ across the output inductor $L_{OUT}$.

In the illustrated embodiment, the power converter 200 is operated in a non-zero voltage switching mode. The relative phase between the inverter 210 and the post-regulator 260 is such that the fifth and sixth controllable switches Q5, Q6 carry negative currents when on, resulting in lower switching efficiency.

Those skilled in the art should understand that the previously described embodiments of the post-regulator and method for feeding back a phase-shifted output waveform to regulate the output of a power converter are submitted for illustrative purposes only and other embodiments capable of regulating a power converter with the phase-shifted waveform are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies. Additionally, the principles of the present invention may be applied to various half bridge, full bridge, flyback, and boost converter topologies employing discrete or integrated magnetics. For a better understanding of a variety of power converter topologies employing discrete and integrated magnetic techniques, see *Modern DC-to-DC Switchmode Power Converter Circuits,* by Rudolph P. Severns and Gordon Bloom, Van Nostrand Reinhold Company, New York, N.Y. (1985), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. A post-regulator for a power converter, said power converter having an inverter coupled to an output rectifier, said post-regulator, comprising:

a switching circuit, having at least one controllable switch and coupled to an output of said power converter, that receives an output voltage from said power converter and produces a phase-shifted waveform therefrom; and a transformer, having a primary winding coupled to said switching circuit and a secondary winding coupled to said output rectifier, that delivers said phase-shifted waveform to said output rectifier to regulate said power converter.

2. The post-regulator as recited in claim 1 wherein said switching circuit phase shifts said waveform to increase and decrease said output voltage.

3. The post-regulator as recited in claim 1 wherein said switching circuit is selected from the group consisting of:

a full-bridge topology, and a half-bridge topology.

4. The post-regulator as recited in claim 1 wherein said secondary winding is coupled to a first rectifying diode of said output rectifier and said transformer has a second secondary winding coupled to a second rectifying diode of said output rectifier.

5. The post-regulator as recited in claim 1 wherein said switching circuit operates in a zero voltage switching mode to produce said phase-shifted waveform.

6. A method of operating a post-regulator to regulate a power converter, said power converter having an inverter coupled to an output rectifier, said method comprising:

receiving an output voltage from said power converter into a switching circuit of said post-regulator, said switching circuit having at least one controllable switch and coupled to an output of said power converter;

phase-shifting said output voltage with said switching circuit to produce a phase-shifted waveform; and delivering said phase-shifted waveform to said output rectifier via a transformer having a primary winding coupled to said switching circuit and a secondary winding coupled to said output rectifier.

7. The method as recited in claim 6 wherein said phase-shifted waveform increases and decreases said output voltage.

8. The method as recited in claim 6 wherein said switching circuit is selected from the group consisting of:

a full-bridge topology, and a half-bridge topology.

9. The method as recited in claim 6 wherein said secondary winding is coupled to a first rectifying diode of said output rectifier and said transformer has a second secondary winding coupled to a second rectifying diode of said output rectifier.

10. The method as recited in claim 6 wherein said phase-shifting comprises operating said switching circuit in a zero voltage switching mode.

11. A power converter, comprising:

an inverter;

an isolation transformer having a primary winding coupled to said inverter;

an output rectifier coupled to a secondary winding of said isolation transformer; and a post-regulator, including:

a switching circuit, having at least one controllable switch and coupled to an output of said power converter, that receives an output voltage from said power converter and produces a phase-shifted waveform therefrom, and a regulator transformer, having a primary winding coupled to said switching circuit and a secondary winding coupled to said output rectifier, that delivers said phase-shifted waveform to said output rectifier to regulate said power converter, thereby allowing said inverter to be unregulated.

12. The power converter as recited in claim 11 wherein said inverter is unregulated.

13. The power converter as recited in claim 11 wherein said inverter is operated at a full duty cycle.

14. The power converter as recited in claim 11 wherein said switching circuit phase shifts said waveform to increase and decrease said output voltage.

15. The power converter as recited in claim 11 wherein said inverter is selected from the group consisting of:

a full-bridge inverter, and a half-bridge inverter.

16. The power converter as recited in claim 11 wherein said switching circuit is selected from the group consisting of:

a full-bridge topology, and a half-bridge topology.

17. The power converter as recited in claim 11 wherein said secondary winding is coupled to a first rectifying diode of said output rectifier and said regulator transformer has a second secondary winding coupled to a second rectifying diode of said output rectifier.

18. The power converter as recited in claim 11 wherein said switching circuit operates in a zero voltage switching mode to produce said phase-shifted waveform.

* * * * *